Figure 1:
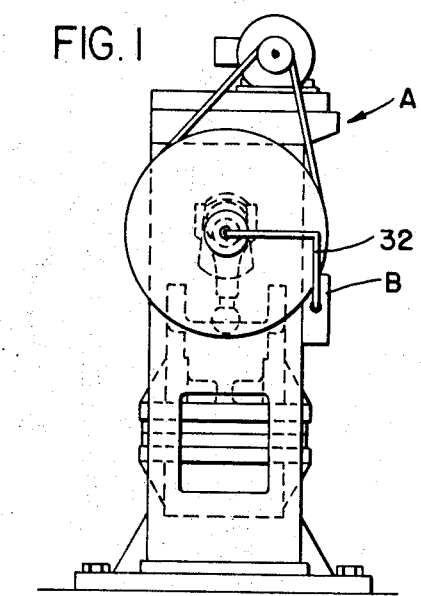

United States Patent

[11] 3,578,112

[72] Inventor Edward J. Freeland
 Hastings, Mich.
[21] Appl. No. 852,013
[22] Filed Aug. 21, 1969
[45] Patented May 11, 1971
[73] Assignee Gulf & Western Industrial Products
 Company
 Grand Rapids, Mich.

[54] POWER PRESS LUBRICATING SYSTEM
 5 Claims, 2 Drawing Figs.
[52] U.S. Cl..................................................... 184/6,
 200/61.58
[51] Int. Cl..................................................... F01m 9/12
[50] Field of Search........................................... 184/6, 6
 (C), 6 (D); 91/2; 200/82, 61.58; 92/153; 29/26

[56] References Cited
UNITED STATES PATENTS
2,688,382 9/1954 Georgeff..................... 184/6
2,857,491 10/1958 Harter......................... 184/6X
2,833,939 5/1958 Leber.......................... 200/61.58X
3,026,387 3/1962 Ashbough................... 184/6X Primary Examiner—Manuel A. Antonakas
Attorney—Meyer, Tilberry and Body ABSTRACT: In a power press of the type having at least two relatively movable components in interfrictional contact at a selected area during relative movement of these components, means for selectively operating the press in one of two modes, and means for lubricating the selected area, the lubricating means including a lubricant injector having an inlet and outlet, the inlet being connected to a supply of lubricant and the outlet being communicated with the selected area. The power press includes an improved lubricating system comprising: first lubrication control means operative when the press is operating in one of the modes for actuating the lubricant injector; and second lubrication control means operative when the press is operating in the other of the modes for actuating the lubricant injector.

INVENTOR.
EDWARD J. FREELAND
BY
*Meyer, Tilberry & Body*
ATTORNEYS

POWER PRESS LUBRICATING SYSTEM

This application pertains to the lubrication art and more particularly to an improved lubricating system for power presses.

The invention is particularly applicable to a power press of the type which may be operated either automatically or manually and will be described with reference thereto; however, it is to be appreciated that the invention has broader applications and may be used with any power press which has a plurality of selectable modes of operation.

Conventional power presses have many relatively movable components, such as a ram and a guide in which the ram travels, to name only one. The invention is applicable to lubricating these relative movable components; however, lubrication of the ram and guide will be discussed for illustration of the invention. These two components are in interfrictional contact at a selected area during the movement of the ram in the guide. Such presses are generally adapted to have two modes of operation, manual and automatic. When set for automatic operation, the press runs continuously. Alternatively, if manual operation is selected, the press will run on a single-stroke basis. The press further includes means for lubricating the selected area where the movable components are in interfrictional contact. The lubricating means generally includes a lubricant injector having an inlet and outlet, the inlet being connected to a supply of lubricant and the outlet being communicated with the selected area in order to properly lubricate the movable components.

Heretofore, power presses of the type described above have generally included a lubricating system comprising a synchronous motor timer, and means for interconnecting the motor and lubricant injector. The synchronous motor is interconnected with the press circuitry and in this manner operates whenever the press is energized. The synchronous motor drives the connecting means which includes a timer dial for periodically actuating the lubricant injector. When the lubricant injector is actuated, lubricant is drawn from a reservoir and is transported to the selected area in order to lubricate the movable components.

The principle problem with the above-described lubricating system is that it fails to properly lubricate the press for all modes of operation. When the press is set for automatic operation, and hence running continuously, the synchronous motor is also running continuously and the press is properly lubricated. However, when the press is set for manual operation, and hence operating on a single-stroke basis, the synchronous motor only operates intermittently and the press is not lubricated at the requisite rate. As such, the likelihood of damage to press components is greatly increased when the press is operated manually.

The present invention contemplates a new and improved apparatus which overcomes the above referred problem and others, and provides a lubricating system for power presses which supplies the requisite amount of lubricant to the movable components regardless of the mode of press operation.

In accordance with the present invention there is provided a lubricating system for power presses of the type having at least two relatively movable components in interfrictional contact at a selected area during such movement, means for selectively operating the press in one of two modes, and means for lubricating the selected area, the lubricating means includes a lubricant injector having an inlet and outlet, the inlet being connected to a supply of lubricant and the outlet being communicated with the selected area; the improved lubricating system comprising: first lubrication control means operative when the press is operating in one of the modes for actuating the lubricant injector; and second lubrication control means operative when the press is operating in the other of the modes for actuating the lubricant injector, whereby the lubricant injector is actuated regardless of the mode of operation of the press.

The principle object of the present invention is to provide an improved lubricating system for power presses.

An additional object of the present invention is to provide an improved lubricating system for power presses which will supply the requisite amount of lubricant regardless of the mode of press operation.

A further object of the present invention is to provide an improved lubricating system for power presses which is capable of installation on existing presses.

A still further object of the present invention is to provide an improved lubricating system for power presses which is simple and economical to manufacture.

Figure 2:
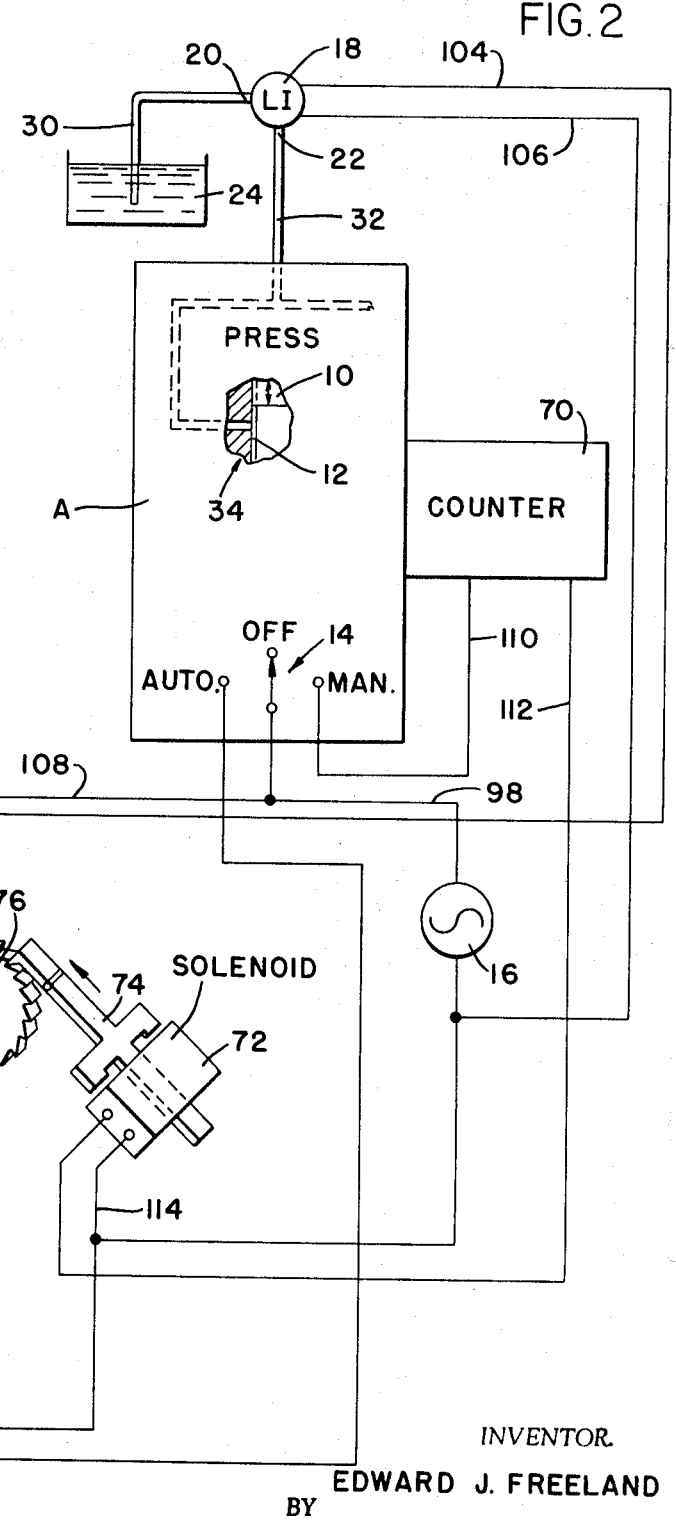

These and other objects and advantages will become apparent from the following description used to illustrate the preferred embodiment of the invention when read in connection with the accompanying drawings in which:

FIG. 1 is a side elevational view of a conventional power press having an improved lubricating system constructed in accordance with the preferred embodiment of the present invention; and FIG. 2 is a schematic drawing of the power press and improved lubricating system of FIG. 1.

Referring now to the drawings wherein the showings are for the purpose of illustrating the preferred embodiment of the invention only and not for the purpose of limiting same, FIG. 1 shows the overall arrangement of a power press, designated generally by the reference letter A, having installed thereon an improved lubricating system, designated generally by the reference letter B, constructed in accordance with the present invention.

As shown in FIG. 2, the press includes a ram 10 and a guide 12. The ram 10 moves in a substantially vertical direction relative to the guide 12 and is in interfrictional contact therewith. A three-position switch, designated generally by the reference numeral 14, controls the operation of the press A. The switch 14 includes an "off" position, an "automatic" position and a "manual" position. When set in the "automatic" position, the press A will run continuously. On the other hand, when the switch 14 is set in the "manual" position, the press A will operate on a single-stroke basis. Energization of the press A, and hence the lubricating system B is provided by an external power source 16 which is connected to the switch 14 by lead 98.

In order to furnish lubricant to the press, there is provided lubricating means including a lubricant injector 18 having an inlet 20 and an outlet 22. The inlet 20 is connected to a lubricant reservoir 24 by a lubricant reservoir line 30. The outlet 22 is connected to a lubricant supply line 32 which carries the lubricant to various locations within the press A, and particularly to a selected area, designated by the reference numeral 34, throughout which the ram 10 and guide 12 are in interfrictional contact.

In accordance with the present invention there is provided first lubrication control means for actuating the lubricant injector 18. The first lubrication control means includes a synchronous motor 36 which is operative when the switch 14 is set in the "automatic" position. The motor 36 is electrically connected to the switch 14 and power source 16 by leads 100, 102, respectively. The motor 36 has a drive shaft 38 to which has been secured a gear 40 for rotation therewith. A bevel gear 42, which is secured to one end of a shaft 44, is in driving engagement with the gear 40. Secured to the other end of the shaft 44 is a sprocket gear 50.

The actuation of the lubricant injector 18 is controlled by a switch 52. The lubricant injector 18 is electrically connected to the switch 52 and power source 16 by leads 102, 106, 108, respectively. In accordance with the present invention there is provided cam means for periodically actuating the switch 52 which may take many forms, such as a breakout or tab-type cam. However, in the preferred embodiment it is shown as a disc 54 having a plurality of axial openings 56 spaced about the circumference thereof. A plurality of actuator pins 58 are disposed in some of the openings 56 to define a preselected cam configuration on the disc 54. The switch 52 is located adjacent the disc 54, whereby when the disc rotates the actuating pins 58 depress an actuating lever 60 on the switch which in turn causes the lubricant injector 18 to be energized. The cam means further includes a disc sprocket gear 62 which is coaxially secured to the disc 54. A drive chain 64 interconnects the sprocket gear 50 with the disc sprocket gear 62, whereby when the motor 36 is energized the disc 54 rotates.

In accordance with the present invention there is further provided second lubrication control means for actuating the lubricant injector 18 which may take a variety of forms; however, in the preferred embodiment it is shown as including a counter 70 and a solenoid 72. The counter 70 is electrically connected to the switch 14 and solenoid 72 by leads 110, 112 respectively, and is energized when the switch 14 is in the "manual" position. In this position the press A is operated on a single-stroke basis and the counter 70 counts the individual number of press strokes. The solenoid 72 is electrically connected to the power source 16 by lead 114, and includes a drive pawl 74 which is in driving engagement with a ratchet wheel 76 that is secured to the outermost end of the drive shaft 38. When the counter 70 reaches a predetermined count, it energizes the solenoid 72, thereby causing the drive pawl 74 to extend outward away from the solenoid and rotate the ratchet wheel 76. Since the gear 40 is also mounted on the drive shaft 38, it too rotates when the ratchet wheel rotates. This rotational force is transmitted through the drive train and causes the disc 54 to also rotate. The counter 70 is programmed with a predetermined count that will cause the solenoid 72 to be actuated with sufficient frequency in order that drive shaft 38 will rotate at the same rate, regardless of the mode of press operation. In this manner, the press A will receive the requisite amount of lubrication whether operating continuously or on a single-stroke basis.

With the foregoing information in mind, the operation of the improved lubricating system is as follows. Power source 16 furnishes the requisite power to both the press A and the components of the lubricating system B. When the switch 14 is turned to the "automatic" position, the press A will run continuously. With the switch so set, the synchronous motor 36 is energized, thereby causing the drive shaft 38 to rotate at a preselected rate. By means of the drive train heretofore described, rotation of the drive shaft 38 will cause the disc 54 to rotate. At preselected points in disc rotation, actuating pins 58 will depress the actuating lever 60 of the switch 52, thereby energizing the lubricant injector 18. Upon such energization, lubricant is pumped from the reservoir 24 through the reservoir line 30 and thence through the supply line 32 and is distributed at various points in the press A, such as at the selected area 34.

When the switch 14 is set in the "manual" position, the press A operates on a single-stroke basis and the counter 70 counts the number of press strokes. When a predetermined count is reached, the counter 70 causes the solenoid 72 to be energized. Upon such energization, the drive pawl 74 moves outward from the solenoid 72 to rotate ratchet wheel 76. Since gear 40 and ratchet wheel 76 are both mounted on drive shaft 38, when the ratchet wheel is rotated the gear also rotates. In so doing, it causes the above described drive train to rotate the disc 54. At preselected points in disc rotation the actuator pins 58 will depress the actuating lever 60 of the switch 52, thereby energizing the lubricant injector 18. The result of such energization has heretofore been described. It is important to note that drive shaft 38 will rotate at the same rate of speed, due either to the output of the motor 36 or the rotation of the ratchet wheel 76, thereby providing the requisite amount of lubricant to the press A regardless of the mode of press operation.

I claim:

1. In a power press of the type having at least two relatively movable components in interfrictional contact at a selected area during relative movement of said components, means for selectively operating said press in one of two modes, and means for lubricating said selected area, said lubricating means including a lubricant injector having an inlet and outlet, said inlet being connected to a supply of lubricant and said outlet being communicated with said selected area; the improvement comprising: first lubrication control means operative when said press is operating in one of said modes for actuating said lubricant injector; and second lubrication control means operative when said press is operating in the other of said modes for actuating said lubricant injector, whereby said lubricant injector is actuated regardless of the mode of operation of said press.

2. The lubricating system defined in claim 1, wherein said first lubrication control means includes a motor operative when said press is operating in one of said modes, a switch adapted to control the energization of said lubricant injector, cam means for periodically actuating said switch, and means for drivingly connecting said cam with said motor, whereby said cam periodically actuates said switch when said motor is operative.

3. The lubricating system defined in claim 2, wherein said second lubrication control means includes means operative when said press is operated in the other of said modes for counting the number of press strokes, a solenoid connected to said counting means and having a driving output, and means for connecting the driving output of said solenoid to said cam means, whereby when said counting means reaches a preselected count said solenoid is energized and drives said cam.

4. The lubricating system defined in claim 3, further including means for interconnecting said connecting means of said first lubrication control means and said connecting means of said second lubrication control means.

5. A lubrication control system for use with power presses of the type having at least two relatively movable components in interfrictional contact at a selected area during relative movement of said components, means for selectively operating said press in one of two modes, and means for lubricating said selected area, said lubricating means including a lubricant injector having an inlet and outlet, said inlet being connected to a supply of lubricant and said outlet being communicated with said selected area, said lubrication control system comprising: first lubrication control means operative when said press is operating in one of said modes for actuating said lubricant injector; and second lubrication control means operative when said press is operating in the other of said modes for actuating said lubricant injector, whereby said lubricant injector is actuated regardless of the mode of operation of said press.